Aug. 2, 1960 — R. A. PETERSON — 2,947,377

WELL-SHOOTING SYSTEM

Original Filed Oct. 3, 1952

INVENTOR.
RAYMOND A. PETERSON,
BY
ATTORNEY.

United States Patent Office 2,947,377
Patented Aug. 2, 1960

2,947,377

WELL-SHOOTING SYSTEM

Raymond A. Peterson, Altadena, Calif., assignor to United Geophysical Corporation, Pasadena, Calif., a corporation of California Continuation of application Ser. No. 313,020, Oct. 3, 1952. This application Nov. 29, 1956, Ser. No. 625,190

6 Claims. (Cl. 181—.5)

This invention relates to seismic surveying, and particularly to improvements in apparatus for determining the velocities of seismic waves through underground formations by well-shooting methods. This application is a continuation of my application Serial No. 313,020, filed October 3, 1952, which was abandoned after this application was filed.

In the methods of seismic surveying generally employed, seismic waves are generated at various seismic wave generating stations adjacent the surface of the earth. The waves travel downwardly and, upon encountering various subterranean strata or other discontinuities, are partially reflected, diffracted, or refracted back to the surface. The waves returned to the surface from various discontinuities are detected at various seismic wave receiver stations, and records are made of the returned waves. By taking into account the velocity with which the waves travel, the depth and the strike and dip of the strata that have reflected the waves and also the location of other discontinuities may be determined from the times required for the waves to travel from the various seismic wave generating stations to the discontinuities and then to the seismic wave receiver stations and from the spacing of the stations. The resultant survey of the subterranean formations determined from the records of the waves is employed to determine where petroleum is most likely to be found in the area surveyed.

It is well known that the velocity with which seismic waves travel in the earth varies from one formation to another, increasing more or less with increase in depth. For this reason, to aid in making seismic wave surveys, various methods have been devised for determining the average seismic wave velocity over various depth ranges.

Seismic surveying is often conducted in areas where a well has already been drilled. Such wells are generally full of liquid. In such an area, the average velocity in the formations is determined as a function of depth by a technique called well-shooting.

In such well-shooting, seismic waves are generated at a point adjacent the surface of the earth, and an attempt is made to measure the time required for the seismic waves to travel from the generation point to a point in the well beneath the surface. In methods of well-shooting heretofore employed, it has been customary to lower or raise a seismometer in a well by means of a cable, suspend the movement of the cable at different depths, and to generate seismic waves at a common seismic wave generating station while the seismometer is at the respective depths in the well.

A seismometer of the type that has been employed heretofore in well-shooting has included an inertia member resiliently suspended within a case and means for detecting relative movement of the case and the inertia member. With such a seismometer, the inertia member moves relative to the case in response to linear forces applied to the case by the seismic waves reaching the seismometer.

In practice, the cable itself is often capable of transmitting vibrations along its length to the seismometer with a velocity that is higher than that of seismic waves in neighboring formations. For this reason, the seismometer often receives vibrations traveling along the length of the cable before it receives seismic waves traveling directly to the seismometer through the earth. Under such conditions it is often difficult, if not impossible, to measure accurately the time of arrival at the seismometer of seismic waves that travel through the earth formations to the seismometer in the well. Errors in ascertaining the time of arrival of the waves traveling through the formations introduce errors into the velocity values determined therefrom and hence cause errors in the calculation of the depth and the strike and dip of reflecting strata and also cause other errors in a seismic survey.

According to this invention, a pressure responsive transducer immersed in the well liquid is employed to detect the seismic waves. Such a device is relatively insensitive to translational forces, thereby rendering it insensitive to vibrations traveling thereto along the length of the cable. However, such a device responds to changes in pressure in the well fluid. Since such pressures are created in the well fluid in response to vibrations occurring in the neighboring formations, the arrival of a seismic wave that has traveled through the formations may be detected without any substantial interference from vibrations that have traveled to the transducer along the cable. For this reason, the time of arrival of a seismic wave at the transducer may be more readily and accurately determined. Accordingly, as a consequence of this invention, more reliable determinations of seismic wave velocities and hence more accurate seismic surveys of underground formations are obtained.

Other features and advantages of my invention will become apparent from the following specification taken in connection with the accompanying drawing, wherein.

Figure 1:
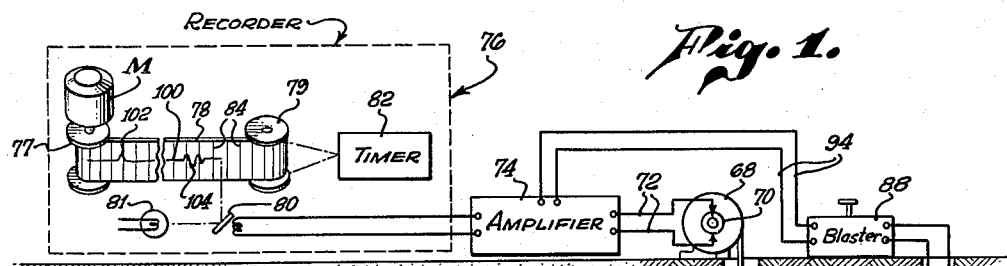
Figure 1 is a schematic view of apparatus employing my invention.

Referring to the drawing, and particularly to Fig. 1, there is illustrated an embodiment of the invention including a seismic wave generating station 10 spaced laterally from a well 12 containing liquid. The seismic wave generating station 10 comprises a shot-hole drilled to a predetermined depth below the weathered layer 14. The well 12 is also drilled through the weathered layer 14 and into the underlying formation, but to a much greater depth. The shot-hole may be several hundred feet or less deep, but the well is generally many thousands of feet deep.

Generally, as is well known, the velocity of seismic waves in the weathered formation is low, being of the order of several hundred feet per second to a few thousand feet per second, but the seismic wave velocity in successive layers 16, 17, 18, 19, . . . 30, 31, 32 is almost invariably much higher than that in the weathered layer and is generally of the order of many thousands of feet per second. Generally speaking, the average velocity varies with depth in the manner indicated by the graph of Fig. 2. In this graph, relatively low velocities L of about 1500 ft./sec. are indicated to occur in the weathered layer, and relatively high velocities H from about 6500 ft./sec. to over 10,000 ft./sec. are indicated to occur in the underlying formations. The sharp discontinuity B in the curve occurs at the bottom of the weathered layer. In this graph, the average velocities L in the weathered layer are taken over a range from the surface to the depth in question in the weathered layer, and the average velocities H are taken over a range from the bottom of the weathered layer to the depth in question.

The velocity of sound in the well liquid is generally about 5000 ft./sec. or less, and is thus usually less than the average velocities of seismic waves observed over various depth ranges of subterranean strata.

The velocity of sound in the materials of which the cable is composed is often greater than that in various earth formations and may be from 10,000 ft./sec. to 16,000 ft./sec.

Figure 2:
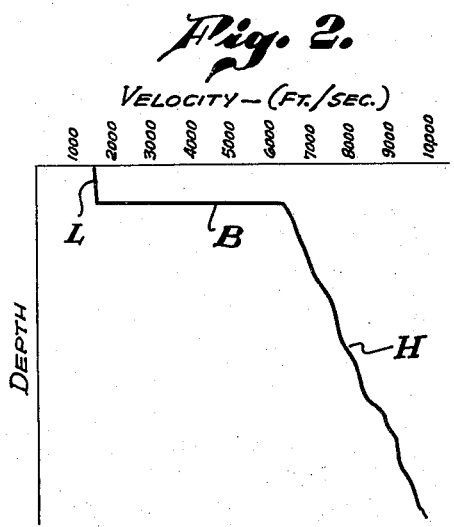
Fig. 2 is a graph showing variations of average seismic wave velocity with depth.

According to this invention, a pressure responsive transducer 40 is lowered into the well 12 to a series of predetermined depths. Then, while the transducer 40 is held stationary at each depth, a seismic wave is generated at the bottom of the shot-hole 10. The time required for such a wave to travel from the generating station 10 to the pressure responsive transducer 40 is measured. From this time and from the spacing of the shot-hole 10 and well 12, the depth at the bottom of the shot-hole 10 and the depth of the pressure responsive transducer 40, the average velocity required for seismic waves to travel over the range of depth in question from the bottom of the shot-hole to the transducer is calculated by methods well known in the art. From a series of such measurements for different depths of the transducer, a curve H of Fig. 2 is obtained. The data from this curve are then employed in making a seismic survey.

Figure 3:
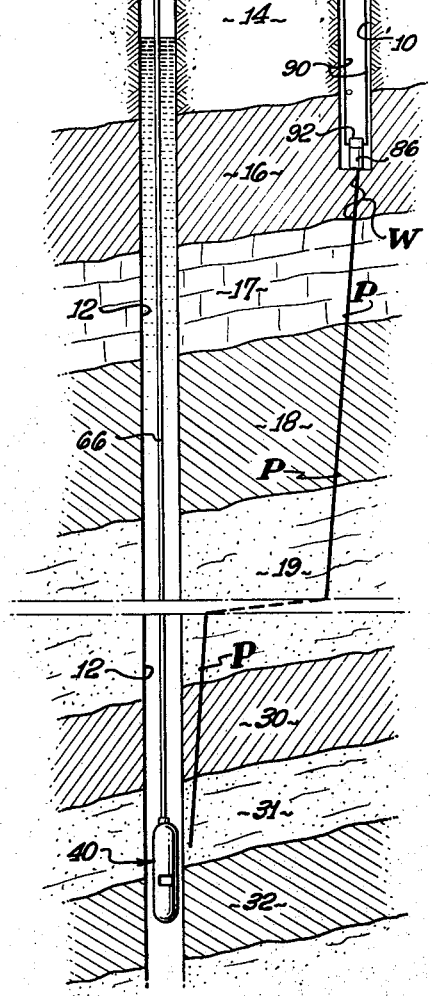
Fig. 3 is a cross-sectional, partially schematic view of a pressure responsive device employed in this invention.
Figure 3:
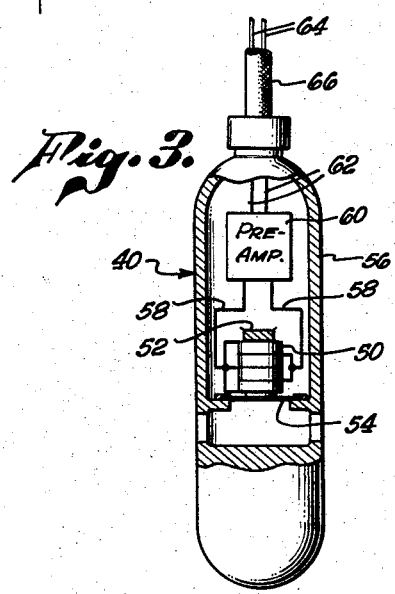

A pressure responsive transducer 40 suitable for use in practicing this invention is illustrated in Fig. 3. In this transducer a series of piezo-electric crystals 50 are mounted beneath a stationary member 52 and a resilient external wall member, such as a diaphragm 54. The stationary member 52 is fixed in position within a case 56. The diaphragm 54 is mounted in the wall of the case 56 in a position where it is exposed to well liquid. Alternate piezo-electric crystals 50 are arranged with their electric axes opposed, and conductors 58 connected to opposite abutting faces of the crystals lead to the input of a preamplifier 60 that is also mounted within the case 56. A pressure responsive transducer 40 of this type is illustrated and described in greater detail in copending patent application Serial No. 366,093, filed July 6, 1953, by Douglas G. Marlow.

Conductors 62 connected to the output of the preamplifier 60 connect with corresponding conductors 64 in a cable 66, which leads upwardly in the well 12 to a winch 68 at the top of the well. The conductors 64 connect to a pair of slip rings 70 which in turn are connected to conductors 72 that lead to the input of a seismic wave amplifier 74. The output of the amplifier 74 is fed to an oscillographic recorder 76.

The recorder 76 is of the conventional type which includes a motor M that drives a takeup drum, or spool, 77 for drawing a long narrow strip of photographic paper 78, or other recording medium, from a feed drum, or spool, 79, past a recording element, such as a galvanometer 80 contained therein.

The galvanometer 80 reflects light from a source 81 onto the photographic paper 78. When no electric wave appears at the output, the galvanometer exposes the paper to such light at a predetermined distance between the sides of the paper. However, when an electric wave appears at the output of the amplifier 74, the light beam is deflected in a direction transverse to the length of the paper, causing a latent oscillographic trace 100 to be made thereon. The recorder 76 also comprises a timer 82 which exposes the paper to produce latent spaced timing lines 84 at regular time intervals along the length of the paper. Usually the intervals are 0.01 sec., and every tenth line is darker than intervening lines. As is well known, this latent trace and the latent timing lines are developed to produce a seismic wave record from which the time intervals between the occurrence of different waves may be readily determined.

At the seismic wave station 10, seismic waves are generated in any conventional manner, such as by exploding a charge 86 of dynamite by manipulation of a blaster 88. The blaster 88 is connected by conductors 90 to a detonating cap 92 connected with the charge of dynamite 86, and the explosion is created by means of an electric current transmitted by the blaster over these conductors to the detonating cap. The blaster is also connected electrically by means of conductors 94 to the amplifier 74.

In use, when the pressure responsive transducer 40 is located at a predetermined depth in the well, a charge of explosive located at the bottom of the shot-hole 10 is detonated by operation of the blaster 88. An electrical impulse produced at the time of the explosion is transmitted over the cable 94 to the amplifier 74 and from thence to the galvanometer 80.

The resultant seismic wave disturbance produced at the bottom of the shot-hole 10 produces a seismic wave indicated by the curve W which travels downwardly through the various formations 18, 19, . . . 30, 31, 32 along the path P to the side walls of the well 12 adjacent the transducer 40. The vibration of various portions of the formation adjacent the wall of the well produces a variation of liquid pressure in the well.

The variations in pressure in the well liquid act upon the diaphragm 54, alternately compressing and expanding the piezo-electric crystals 50. As a result, the pressure fluctuations in the well fluid cause corresponding electrical waves to be produced across the conductors 58. The resultant electrical waves are amplified by the preamplifier 60 and are carried by the conductors 62 and the conductors 64 through the cable 66 to the surface, and thence through the slip rings 70 and conductors 72 to the amplifier 74.

While no signals are impressed upon the amplifier 74, the galvanometer 80 of the recorder 76 remains stationary, and a straight trace 100 is produced on the record 78. But when an electrical pulse from the shot-hole 10 is impressed upon the amplifier 74, the galvanometer is deflected, producing a sharp pip or time break 102 in the trace 100. Also, when electrical waves from the transducer 40 are impressed upon the amplifier 74, the galvanometer 80 oscillates in a corresponding manner, producing a wave 104 on the trace. By virtue of the fact that the pressure responsive transducer 40 is relatively insensitive to translational forces, vibrations that may be transmitted thereto downwardly along the cable 66 produce substantially no electrical effect at the amplifier 60 and hence do not disturb the trace 100. This has great advantages when the velocity of sound in the cable is higher than the average velocity of seismic waves in the adjacent formation, as in this case the masking effects of vibrations traveling along the cable are substantially eliminated.

The time of commencement of the pip 102 indicates the instant of initiation of the generation of the seismic waves. And the time of commencement of the wave 104 indicates the instant of inception of pressure changes in the well fluid produced by seismic waves traveling thereto through the formations lying between the bottom of the shot-hole and the position of the transducer 40 in the well. These times are determined from the record by examination of the timing lines 84, and the interval between these times is employed as mentioned above to determine the average velocity for seismic waves to travel from the shot-hole 10 to the depth of the transducer 40. By repeating such determination for different depths of the transducer 40, a velocity log such as that indicated by curve H of Fig. 2 is obtained.

A pressure responsive transducer of the type employed in this invention responds to pressure changes in the well fluid, even if the transducer remains stationary. Such a transducer is also relatively insensitive to movement of the transducer as a whole and to the movement of liquid past the transducer. It is for this reason that the transducer is selectively responsive to pressure changes in the well fluid in preference to vibrations transmitted along the cable to the transducer. The improved accuracy and reliability of determination of average seismic wave velocity obtained in this well-shooting method is directly attributable to such selectivity in the response of the transducer.

Although only one particular form of the invention has been specifically disclosed, it will be obvious that the invention is not limited thereto, but is capable of a variety of mechanical embodiments. Various changes which will now suggest themselves to those skilled in the art may be made in the material, form, details of construction, and arrangement of the elements without departing from the principles of the invention. It is therefore to be understood that the invention is not limited to the particular form thereof disclosed, but embodies other forms coming within the scope of the appended claims.

The invention claimed is:

1. In a well shooting apparatus in which seismic waves are generated at a seismic wave generating station located at a point spaced laterally from a well containing liquid, and in which seismic waves are received at a series of points at different depths in said well, the combination of:

a cable and means for lowering an end of said cable in said well to such depths;

means for initiating a seismic wave at said seismic wave generating station while said cable end is supported at each of said depths, the relative positions of said cable end and generating station at each of said depths in said well and the relative velocity of travel of waves in the cable and in the formations surrounding said well being such that waves travel from said seismic wave generating station to said cable and along the cable in less time than seismic waves travel thereto through formations surrounding the well;

a pressure-responsive transducer connected to said cable end, said transducer being selectively responsive to changes in pressure in the well liquid compared with vibrations transmitted to said transducer along the length of the cable, said transducer comprising a case adapted to be lowered in said well, said case having a relatively thick wall portion having a opening therein and a resilient external wall member closing said opening, and also comprising means located within said case for detecting movement of said resilient wall member in response to a change in pressure of the liquid in the well; and means for measuring the time elapsed between the initiation of each of said seismic waves and the detection of the inception of pressure changes produced in the well by seismic waves traveling through such formations to each of said depths, whereby the velocity of transmission of seismic waves from said seismic wave generating station through formations of the earth to said depths may be determined.

2. In well-shooting apparatus in which seismic waves are generated at a seismic wave generating station located at a point spaced laterally from a well containing liquid, and in which seismic waves are received at a series of points at different depths in said well, the combination of:

a cable and means for lowering an end of said cable in said well to such depths;

means for initiating a seismic wave at said seismic wave generating station while said cable end is supported at each of said depths, the relative positions of said cable end and generating station at each of said depths in said well and the relative velocity of travel of waves in the cable and in the formations surrounding said well being such that waves travel from said seismic wave generating station to said cable end along the cable in less time than seismic waves travel thereto through formations surrounding the well;

a pressure-responsive transducer connected to said cable end, said transducer being selectively responsive to changes in pressure in the well liquid compared with vibrations transmitted to said transducer along the length of the cable, said transducer comprising an elongated case adapted to be lowered in said well, said elongated case having a relatively thick side wall and a resilient, transversely arranged external wall member secured thereto, and also comprising means located within said case for detecting longitudinal movement of said resilient wall member in response to a change in pressure of the liquid in the well;

and means for measuring the time elapsed between the initiation of each of said seismic waves and the detection of the inception of pressure changes produced in the well by seismic waves traveling through such formations to each of said depths, whereby the velocity of transmission of seismic waves from said seismic wave generating station through formations of the earth to said depths may be determined.

3. In well-shooting apparatus in which seismic waves are generated at a seismic wave generating station located at a point spaced laterally from a well containing liquid, and in which seismic waves are received at a series of points of different depths in said well, the combination of:

a cable and means for lowering an end of said cable in said well to such depths;

means for initiating a seismic wave at said seismic wave generating station while said cable end is supported at each of said depths, the relative positions of said cable end and generating station at each of said depths in said well and the relative velocity of travel of waves in the cable and in the formations surrounding said well being such that waves travel from said seismic wave generating station to said cable and along the cable in less time than seismic waves travel thereto through formations surrounding the well;

a pressure-responsive transducer connected to said cable end, said transducer being selectively responsive to changes in pressure in the well liquid compared with vibrations transmitted to said transducer along the length of the cable, said transducer comprising an elongated case adapted to be lowered in said well, said elongated case having a relatively thick side wall and a resilient, transversely arranged external wall member forming the lower wall portion of a part of said elongated case, and also comprising means located within said case above said resilient external wall member for detecting longitudinal movement of said resilient wall member in response to a change in pressure of the liquid in the well; and means for measuring the time elapsed between the initiation of each of said seismic waves and the detection of the inception of pressure changes produced in the well by seismic waves traveling through such formations to each of said depths, whereby the velocity of transmission of seismic waves from said seismic wave generating station through formations of the earth to said depths may be determined.

4. In well-shooting apparatus in which seismic waves are generated at a seismic wave generating station located at a point spaced laterally from a well containing liquid, and in which seismic waves are received at a series of points at different depths in said well, the combination of:

a cable and means for lowering an end of said cable in said well to such depths;

means for initiating a seismic wave at said seismic wave generating station while said cable end is supported at each of said depths, the relative positions of said cable end and generating station at each of said depths in said well and the relative velocity of travel of waves in the cable and in the formations surrounding said well being such that waves travel from said seismic wave generating station to said cable and along the cable in less time than seismic waves travel thereto through formations surrounding the well;

a pressure-responsive transducer connected to said cable end, said transducer being selectively responsive to changes in pressure in the well liquid compared with vibrations transmitted to said transducer along the length of the cable, said transducer comprising an elongated case adapted to be lowered in said well, said elongated case having a transverse passage extending therethrough, said case also having a resilient, transversely arranged external wall member forming part of the wall of said passage, said transducer also comprising means for detecting movement of said resilient member in response to a change in pressure of the liquid in said well; and means for measuring the time elapsed between the initiation of each of said seismic waves and the detection of the inception of pressure changes produced in the well by seismic waves traveling through such formations to each of said depths, whereby the velocity of transmission of seismic waves from said seismic wave generating station through formations of the earth to said depths may be determined.

5. In well shooting apparatus in which seismic waves are generated at a seismic wave generating station located at a point spaced laterally from a well containing liquid, and in which seismic waves are received at a series of points at different depths in said well, the combination of:

a cable and means for lowering an end of said cable in said well to such depths;

means for initiating a seismic wave at said seismic wave generating station while said cable end is supported at each of said depths, the relative positions of said cable end and generating station at each of said depths in said well and the relative velocity of travel of waves in the cable and in the formations surrounding said well being such that waves travel from said seismic wave generating station to said cable and along the cable in less time than seismic waves travel thereto through formation surrounding the well;

a pressure-responsive transducer connected to said cable end, said transducer being selectively responsive to changes in pressure in the well liquid compared with vibrations transmitted to said transducer along the length of the cable, said transducer comprising a case adapted to be lowered in said well, said case having a relatively thick wall portion having an opening therein and a resilient external wall member closing said opening, and also comprising means located within said case for detecting movement of said resilient wall member in response to a change in pressure of the liquid in the well, said means being connected to said case at points thereof which are longitudinally spaced apart a distance which is small compared with the length of the case; and means for measuring the time elapsed between the initiation of each of said seismic waves and the detection of the inception of pressures changes produced in the well by seismic waves traveling through such formations to each of said depths, whereby the velocity of transmission of seismic waves from said seismic wave generating station through formations of the earth to said depths may be determined.

6. In well-shooting apparatus in which seismic waves are generated at a seismic wave generating station located at a point spaced laterally from a well containing liquid, and in which seismic waves are received at a series of points at different depths in said well, the combination of:

a cable and means for lowering an end of said cable in said well to such depths;

means for initiating a seismic wave at said seismic wave generating station while said cable end is supported at each of said depths, the relative positions of said cable end and generating station at each of said depths in said well and the relative velocity of travel of waves in the cable and in the formations surrounding said well being such that waves travel from said seismic wave generating station to said cable end along the cable in less time than seismic waves travel thereto through formations surrounding the well;

a pressure-responsive transducer connected to said cable end, said transducer being selectively responsive to changes in pressure in the well liquid compared with vibrations transmitted to said transducer along the length of the cable, said transducer comprising an elongated case adapted to be lowered in said well, said elongated case having a relatively thick side wall and a resilient, transversely arranged external wall member secured thereto, and also comprising means located within said case for detecting longitudinal movement of said resilient wall member in response to a change in pressure of the liquid in the well, one end of said means being fixed in position within the case at a point that is spaced from said resilient wall member by a distance that is small compared with the length of the case; and means for measuring the time elapsed between the initiation of each of said seismic waves and the detection of the inception of pressure changes produced in the well by seismic waves traveling through such formations to each of said depths, whereby the velocity of transmission of seismic waves from said seismic wave generating station through formations of the earth to said depths may be determined.

References Cited in the file of this patent

UNITED STATES PATENTS

| | | |
|---|---|---|
| 2,425,868 | Dillon | Aug. 19, 1947 |
| 2,712,124 | Ording | June 28, 1955 |

OTHER REFERENCES

Wells, "Well Velocity Shooting in California," Geophysics Magazine, volume XIV, pages 346–356, July 1949.